June 28, 1927.

A. M. WESTERBERG ET AL 1,634,164

KNEE CLAMP

Filed Dec. 23, 1926

INVENTORS
AXEL M. WESTERBERG
and JACOB M. SICKLE
BY
Their ATTORNEY

June 28, 1927.
A. M. WESTERBERG ET AL
1,634,164
KNEE CLAMP
Filed Dec. 23, 1926  2 Sheets-Sheet 2
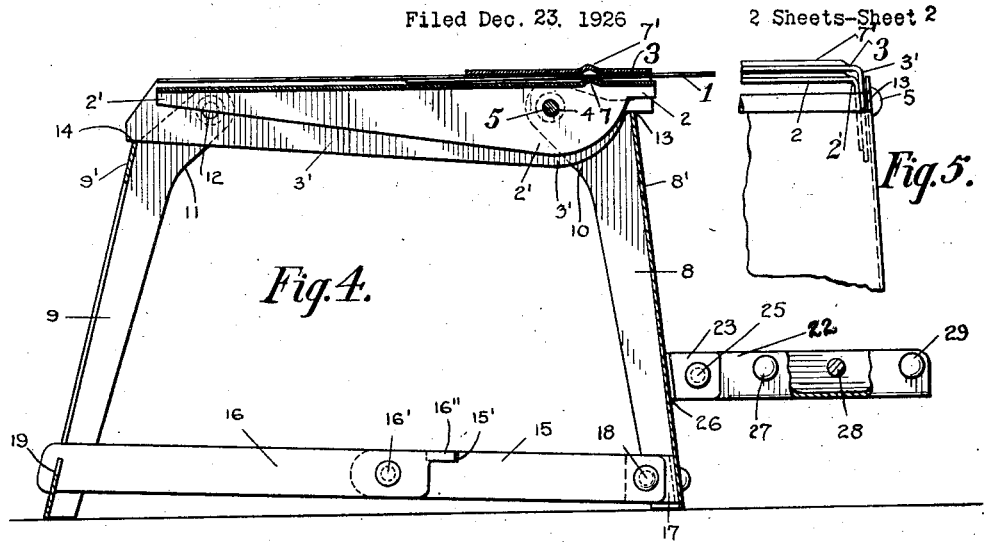
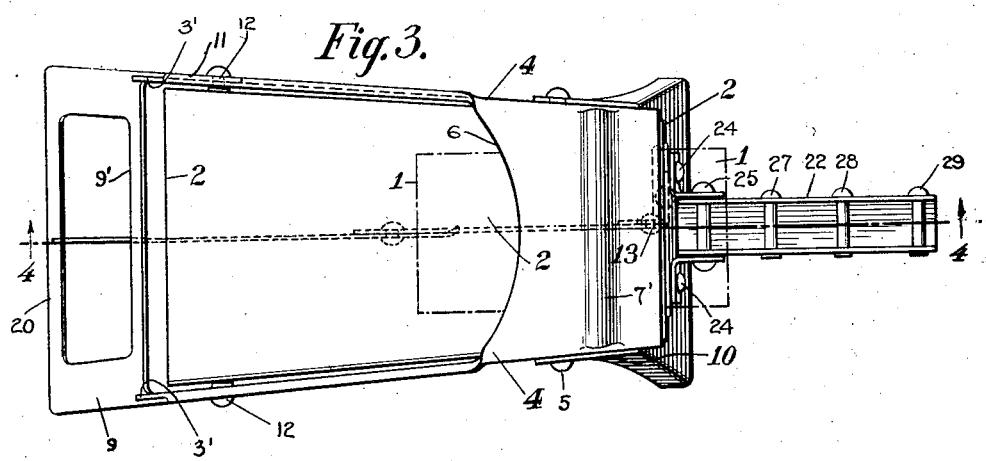
INVENTORS.
AXEL M. WESTERBERG
and JACOB M. SICKLE
BY
ATTORNEY Patented June 28, 1927.

1,634,164

UNITED STATES PATENT OFFICE.

AXEL M. WESTERBERG AND JACOB M. SICKLE, OF NEW YORK, N. Y.

KNEE CLAMP.

Application filed December 23, 1926. Serial No. 156,623.

This invention relates to a tool holding device and a tool shaping and edge finishing apparatus.

The invention generally relates to a device for holding edged tools and coordinately resides in the provision of apparatus whereby cutting and scraping tools may be finished to provide therefor proper cutting edges by sharpening, shaping or otherwise modifying the working edge.

Where we have attempted to maintain cutting, scraping or similar edged tools in proper working condition, particularly with portable power driven machines, we have found that the comparatively inexperienced labor which may probably serve to operate such devices is not in a position, nor sufficiently skilled, to maintain the cutting edges, such as scrapers, in proper working condition, necessitating the supply of expensive accessories.

Where attempts have been made to accommodate normal vises or holding tools for the finishing of edged implements, not only are these devices not suitable for transportation but they are in no way suitable for the more difficult operation of swaging, shaping or otherwise treating such cutting tools as are normally used for scraping surfaces, wooden floors or the like.

An object, therefore, of our invention resides in the provision of a holding device for tools or blades useful in scraping or similar finishing operations, which may be readily carried about in a collapsed form to occupy minimum space in a workman's tool kit and which may be quickly and simply set up and assembled to efficiently hold an edged tool or blade for sharpening, shaping or otherwise modifying its working edge. A still further object of our invention resides in the provision of an edged tool holding device for rigidly holding and clamping a cutting or scraping blade which may be used for its intended function without attachment to any work bench, ledge or similar contrivance but which, by the simple application of the weight of the body of the operator, may serve to hold a tool blade or similar cutting instrument for edge finishing or treatment, such as filing, swaging, curling or the like.

Still more particularly, our invention has among its objects the provision of a blade holding device comprising clamping members serving to apply pressure for holding an edged tool sufficiently rigidly to withstand all resistance in working operation, as filing, burnishing or swaging, and which is obtained merely by the application of the weight of the body of the operator, as by his knee, foot or the like, the arrangement of parts permitting the association therewith of an edge finishing instrumentality to progressively form the edge of the blade or tool and to variously shape the same in accordance with the best practice.

The invention contemplates the provision of a clamping device for edged tools of the character aforementioned in the form of multiple hinged members, the parts serving as the clamping device supporting stand and instrument finishing guide whereby the parts may be arranged to be compactly folded and to be carried about in the workman's kit to occupy the minimum amount of space.

The invention still further contemplates as an object thereof the provision of a rigidly binding, readily detachable clamp for edged tools, scraping blades or the like whose clamping action depends primarily upon the application of pressure of the operator to the members forming the clamp and coordinately resides in the association therewith of an edge treating instrumentality which may be variously positioned in respect to the clamp for progressively finishing or modifying the working edge of the tool or blade aforementioned.

Among its other objects, our invention resides in the provision of a tool clamping device and edge finishing instrumentality whereby various forms of working edges may be imparted to edged tools, blades or the like, as aforementioned.

To attain these objects and such further objects as may appear herein or be hereinafter pointed out, we make reference to the accompanying drawings forming a part hereof, in which—

Figure 3 is a plan view of our device;

Figure 4 is a section taken on a line 4—4 of Figure 3;

Figure 5 is an end elevation of a corner taken from the right hand side of Figure 4;

Figure 6 is a plan view of an edge finishing instrumentality.

Figure 1:
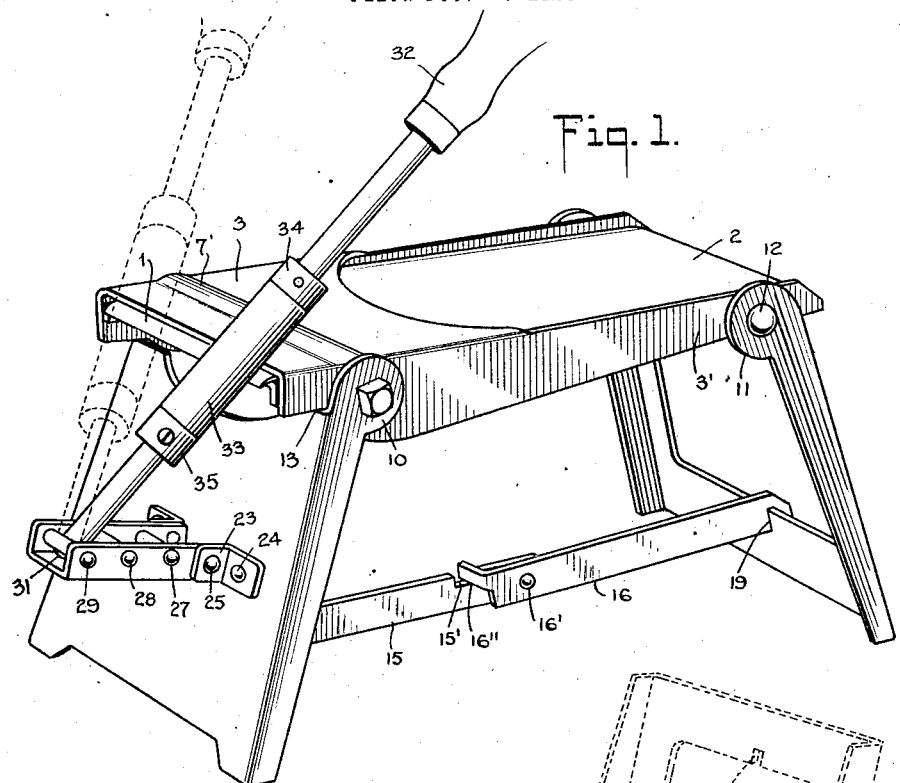
Figure 1 is a perspective view of our device illustrating its use.
Figure 2:
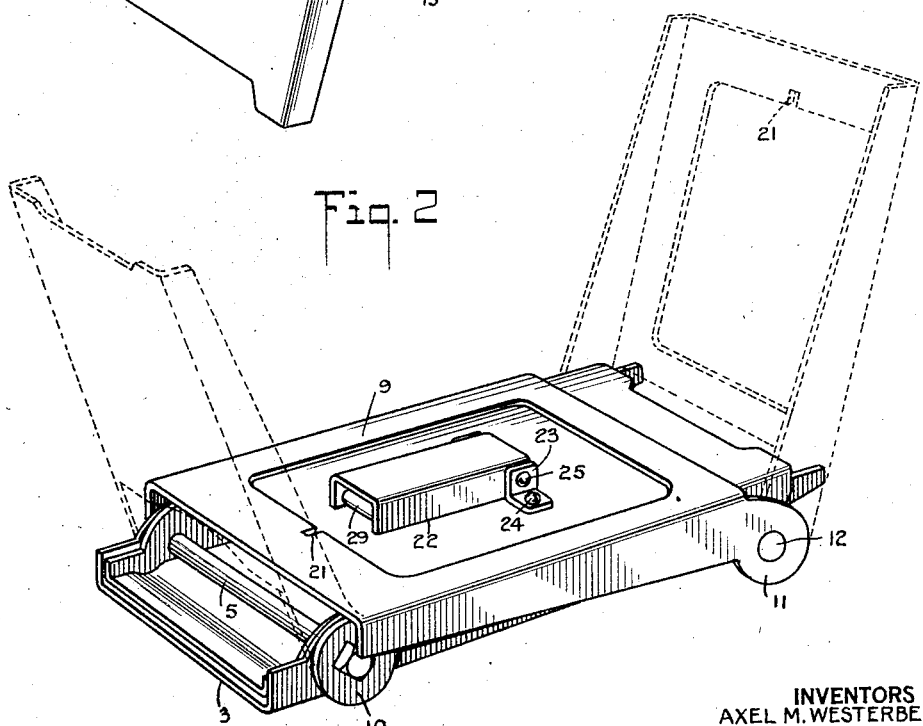
Figure 2 is a perspective view of the device shown in Figure 1 folded up for storage.

Referring particularly to the drawings, our tool holding and edge finishing device is shown illustrated in use for a scraper blade 1 and comprises a pair of clamping jaws 2 and 3 formed of shallow U-shaped members arranged in nested relation with the side walls 2' and 3' overlapping, apertured at 4, through which is passed a bolt 5 serving as a pivot for the jaws.

As previously described, the members 2 and 3 of general U-shaped cross section have the bottom wall portion of the U formed as the jaws for the blade 1. It is preferred to have this bottom wall in the member 2 of extended length, whereas the member 3 has the corresponding portion cut away for a part of its length, as shown at 6 to afford access to the blade 1, for purposes which will hereinafter appear.

These members 2 and 3 pivoted at 4 through the medium of the bolt 5 serve as a pair of clamping jaws suitable for holding a tool blade of a thin cross section. It is preferred, however, to form these clamping jaws near the mouth thereof with offset beaded portions 7 and 7' in the members 2 and 3 respectively. These beaded or offset portions 7 and 7' serve to bind and, in some cases, crimp a tool blade held therebetween when pressure is exerted upon the member 2 to firmly grip a tool blade or similar instrumentality therebetween.

For certain purposes supporting legs are provided for the clamping means previously described in the form of frontal legs 8 and rear legs 9. It is preferred to form these members of metal stampings of general U-shaped cross section with extended side wall flanges or ears 10 and 11, respectively. The frontal legs are pivotally connected to the clamping jaws by connecting the flange 10 upon the cross bolt 5, the bolt 5 therefore serving as a common fulcrum of the clamping jaws and the frontal legs 8. Rearwardly of the member 3 at the side walls 3' there are mounted the legs 9 by passing the bolts 12 through the side walls 3' and the flanges 11 so that the same may be pivotally connected for purposes which will hereinafter appear.

The supporting legs 8 and 9 are permitted limited outward movement by arranging the portions of the intermediate walls 8' and 9' to abut the member 3 at the end of the side walls 3' at 13 and 14 respectively. To further assure stability of the supporting legs we provide a leg tie or brace in the form of a pair of straps 15 and 16 hingedly connected to the legs 8 upon a supporting bracket 17 by a rivet or pin 18. The straps 15 and 16 are further hingedly connected for shortening and folding over each other in a limited direction, being held in rigid alignment by a rivet 16' and cross finger 16" engaging the strap 15 at the slotted portion 15'. The slot 15' is disposed to permit movement of the cross finger 16" just past the dead center of alignment. The outer end of the strap 16 is provided with a hook portion 19 in the form of a slot corresponding to the thickness of the cross member 20 for engaging and rigidly holding and bracing the legs 8 and 9. Additionally for holding the bracing member centrally upon the cross member 20, this latter member is provided with a slot 21.

The tool holding device thus for described may be utilized to rigidly hold any edged tool or blade merely by inserting the same between the jaws 2 and 3 when the jaws are released by upward movement of the rearmost portion of the member 2. Downward pressure upon the member 2 will give powerful clamping action between the jaws 2 and 3. It is preferred to dispose the legs 8 and 9 of such height as to make it comparatively easy for a worker to apply his knee to the member 2 beyond the cutout portion 6 of the member 3. In this position, the edge of the blade or edged tool 1 may be easily operated upon to give it any desired finish for sharpening, swaging or otherwise treating the same.

For certain special edge finishing operations we provide an edge finishing instrumentality support or guide 22 directly under the jaws 2 and 3 and this is preferably mounted upon the frontal face of the legs 8 at the intermediate portion 8', upon a bracket 23 riveted to the frontal face 8' as shown at 24. The guide or instrumentality support preferably comprises a member of channel cross section arranged for pivotal movement by the cross pin or bolt 25 passing through the channel and the bracket aforementioned. The channel is arranged to be folded upwardly to lie upon the face 8' but is prevented from movement downwardly where the edge of the channel engages the intermediate face 8', as shown at 26. Interposed along the length of the channel 22 we provide a series of cross bolts 27, 28 and 29 which serve to make various angles with the jaws 2 and 3, for purposes which will hereinafter appear.

For certain edge finishing operations, an edge finishing instrumentality 30 is supported upon the guide 22 in the channel thereof and by pivotally disposing the end 31 of the instrumentality in the guide and reciprocating the hand holding portion 32 laterally across the edge of a blade, such as 31, there may be imparted edge finishing operations. In the illustration shown, particularly in Figure 1, the edge finishing operation is in the nature of a swaging or curling action of a scraper blade. In such cases we have devised a swaging tool or instrumentality including along the length thereof a roller 33 spaced between collars 34 and 35. Free rolling action upon the shank 30 is obtained by having the diameter of the shank diminished for a portion of its length, supporting the roller as shown at 36. By this construction we are able to properly oil and offer minimum bearing surface for the roller.

With the end of the edge finishing instrumentality supported upon the guide 31 acting as a pivot in the channel 22, lateral restriction of the handle 32 will serve to swage, curl or otherwise modify the edge of the blade disposed in the jaws 2 and 3. It is preferred, particularly where we wish to curl a scraper blade, to begin the swaging operation by pivotally bracing the end of the instrumentality 31 against the cross bolt 29. This position will serve to dispose the edge finishing instrumentality at substantially an obtuse angle. As the swaging or curling is accomplished, the end of the instrumentality 31 is disposed progressively against the cross bolts 28, 27 and 25 to progressively complete the curling or swaging operation in accordance with the best practice for finishing the working edge of such blades.

It will be observed that though we have specifically described an edge finishing instrumentality in the nature of a swaging device, that any other edge finishing instrumentality for sharpening or burnishing may equally be used wherever desired to impart to the edged tool a working edge of definite angularity. It will thus be observed that not only have we provided an efficient tool holding device suitable for use as any worker's vise in any desired manner but have also provided means for efficiently and accurately finishing the edges of cutting, scraping or similar edged tools.

It will further be observed that we have provided a novel work holding device which may be compactly folded to occupy the minimum space in a workman's tool kit.

Having thus described our invention and illustrated its use, what we claim as new and desire to secure by Letters Patent, is—

1. A foldable tool holding and edge finishing device comprising in combination a pair of relatively movable jaws pivotally connected with each other, relatively movable supports for the device hingedly connected to one of said jaws, the other of said jaws being freely disposed so that manual pressure may be applied thereto for clamping the tool in said jaws.

2. A tool holding and edge finishing device comprising in combination tool clamping means and a relatively hingeable support therefor, and an edge finishing instrumentality guide pivotally mounted on said support whereby said clamping means, support and guide may be folded in overlying position.

3. A tool holding and edge finishing device comprising in combination clamping means, supporting legs for said clamping means pivotally connected thereto, whereby said clamping means and supporting legs may be disposed in overlying relationship to compactly store said device.

4. A tool holding and edge finishing device comprising in combination clamping means, supporting legs for said clamping means pivotally connected thereto, an edge finishing instrumentality guide pivotally mounted therewith whereby said members may be disposed in overlying relationship to compactly store said device.

5. A tool holding and edge finishing device including a pair of pressure operable clamping jaws, said jaws being formed with complemental tool crimping portion for rigidly holding the tool in said jaws.

6. A tool holding and edge finishing device including clamping means comprising shallow, substantially U-shaped members in nested relation with the side walls of said U-shaped portions pivotally connected, portions of said bottom walls being formed with offset complemental portions to crimp or bind a tool blade therebetween.

7. A tool holding and edge finishing device including clamping means comprising shallow, substantially U-shaped members pivotally connected, supporting legs therefor pivotally connected with one of said members, said members and said legs being disposed to fold compactly in nested relation.

8. A tool holding and edge finishing device including clamping means comprising shallow, substantially U-shaped members pivotally connected, supporting legs therefor pivotally connected with one of said members, an edge finishing instrumentality guide pivotally mounted therewith, said members, legs and guide being disposed to fold compactly in nested relation.

9. A tool holding and edge finishing device comprising clamping jaws pivotally connected, one of them including a cut away portion, the other including a knee rest disposed therefrom and exposed by said cut away portion for application of pressure to said jaws, an edge finishing guide, an edge finishing instrumentality arranged to be substantially vertically disposed in said guide.

In witness whereof, we have hereunto signed our names this 18th day of December, 1926.

AXEL M. WESTERBERG.
JACOB M. SICKLE.